(12) United States Patent
Tatsuka et al.

(10) Patent No.: US 9,661,333 B2
(45) Date of Patent: May 23, 2017

(54) IMAGE PROCESSOR FOR CODE AMOUNT CONTROL

(75) Inventors: Toshimitsu Tatsuka, Osaka (JP); Hiromu Hasegawa, Osaka (JP); Takeaki Komuro, Osaka (JP); Masato Yamada, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 773 days.

(21) Appl. No.: 13/522,122

(22) PCT Filed: Nov. 29, 2010

(86) PCT No.: PCT/JP2010/071272
§ 371 (c)(1),
(2), (4) Date: Jul. 13, 2012

(87) PCT Pub. No.: WO2011/086779
PCT Pub. Date: Jul. 21, 2011

(65) Prior Publication Data
US 2012/0287990 A1    Nov. 15, 2012

(30) Foreign Application Priority Data
Jan. 14, 2010    (JP) ................................ 2010-005440

(51) Int. Cl.
*H04N 11/04*     (2006.01)
*H04N 7/12*      (2006.01)
(Continued)

(52) U.S. Cl.
CPC ......... *H04N 19/174* (2014.11); *H04N 19/124* (2014.11); *H04N 19/147* (2014.11);
(Continued)

(58) Field of Classification Search
CPC ...... H04N 7/32; H04N 19/124; H04N 19/147; H04N 19/149; H04N 19/174; H04N 19/196; H04N 19/61
(Continued)

(56) References Cited

U.S. PATENT DOCUMENTS 5,231,484 A  *  7/1993  Gonzales et al. ........ 375/240.04
5,905,578 A     5/1999  Fujii et al.
(Continued)

FOREIGN PATENT DOCUMENTS

JP    4 18857    1/1992
JP    6 78283    3/1994
(Continued)

OTHER PUBLICATIONS

International Search Report Issued Feb. 15, 2011 in PCT/JP10/71272 Filed Nov. 29, 2010.
U.S. Appl. No. 13/877,068, filed Mar. 29, 2013, Tatsuka, et al.

*Primary Examiner* — Jorge L Ortiz Criado
*Assistant Examiner* — Yong Joon Kwon
(74) *Attorney, Agent, or Firm* — Oblon, McClelland, Maier & Neustadt, L.L.P.

(57) ABSTRACT

An image processor includes an encoder that performs encoding including quantization on an image signal and a controller that controls a quantization parameter for quantization. The controller determines a quantization parameter of a currently target macroblock as an increase or decrease from a reference value, and determines the increase or decrease based on a difference between a target amount of code for a predetermined number of macroblocks fewer than a total number of macroblocks within one frame and a generated amount of code of the predetermined number of macroblocks processed immediately before. The controller can further determine the increase or decrease, based on
(Continued)

pixel information of the currently target macroblock such as an activity evaluation value.

19 Claims, 6 Drawing Sheets

(51) Int. Cl.
    *H04N 19/174* (2014.01)
    *H04N 19/147* (2014.01)
    *H04N 19/196* (2014.01)
    *H04N 19/149* (2014.01)
    *H04N 19/61* (2014.01)
    *H04N 19/124* (2014.01)

(52) U.S. Cl.
    CPC ......... *H04N 19/149* (2014.11); *H04N 19/196* (2014.11); *H04N 19/61* (2014.11)

(58) Field of Classification Search
    USPC .................................................. 375/240.03
    See application file for complete search history.

(56) References Cited

U.S. PATENT DOCUMENTS

| | | | | |
|---|---|---|---|---|
| 6,064,324 | A * | 5/2000 | Shimizu | H04N 19/176 341/50 |
| 8,331,438 | B2 * | 12/2012 | Chang et al. | 375/240.03 |
| 2001/0007575 | A1 | 7/2001 | Mori et al. | |
| 2001/0055337 | A1 * | 12/2001 | Matsuzaki | H04N 19/503 375/240.12 |
| 2003/0016878 | A1 * | 1/2003 | Motosu | G06T 9/007 382/251 |
| 2003/0133169 | A1 * | 7/2003 | Uchibayashi et al. | 358/426.07 |
| 2005/0147162 | A1 * | 7/2005 | Mihara | 375/240.03 |
| 2005/0152450 | A1 * | 7/2005 | Ueno | H04N 19/159 375/240.03 |
| 2005/0175091 | A1 * | 8/2005 | Puri et al. | 375/240.03 |
| 2007/0140333 | A1 * | 6/2007 | Chono et al. | 375/240.03 |
| 2007/0237223 | A1 * | 10/2007 | Lee | 375/240.03 |
| 2008/0260042 | A1 * | 10/2008 | Shah et al. | 375/240.25 |
| 2009/0046783 | A1 * | 2/2009 | Chen et al. | 375/240.24 |
| 2009/0103609 | A1 * | 4/2009 | Jiang et al. | 375/240.03 |
| 2009/0110063 | A1 * | 4/2009 | Nakayama | 375/240.03 |
| 2010/0002765 | A1 * | 1/2010 | Kondo et al. | 375/240.12 |
| 2010/0098173 | A1 * | 4/2010 | Horiuchi et al. | 375/240.18 |
| 2010/0124285 | A1 * | 5/2010 | Kwon | 375/240.24 |
| 2010/0135386 | A1 * | 6/2010 | Shibata et al. | 375/240.03 |
| 2011/0019930 | A1 * | 1/2011 | Koyabu | H04N 19/159 382/238 |

FOREIGN PATENT DOCUMENTS

| | | |
|---|---|---|
| JP | 8 181987 | 7/1996 |
| JP | 10 215460 | 8/1998 |
| JP | 10 243399 | 9/1998 |
| JP | 10 336649 | 12/1998 |
| JP | 2001 169281 | 6/2001 |
| JP | 2004 357079 | 12/2004 |
| JP | 2011 71778 | 4/2011 |

* cited by examiner

FIG. 12

|      | Th51 | Th52 | Th53 |     |
|      |  →ΔB2 |
| W=0  | 20 | 20 | 20 | 20 |
| W=1  | 20 | 20 | 20 | 20 |
| W=2  | 20 | 20 | 20 | 20 |
| W=3  | 30 | 25 | 20 | 20 |
| W=4  | 40 | 30 | 20 | 20 |

FIG. 13

|      | Th61 | Th62 | Th63 |     |
|      |  →ΔB2 |
| W=0  | 51 | 40 | 35 | 35 |
| W=1  | 51 | 25 | 22 | 20 |
| W=2  | 51 | 30 | 30 | 25 |
| W=3  | 51 | 51 | 51 | 51 |
| W=4  | 51 | 51 | 51 | 51 |

IMAGE PROCESSOR FOR CODE AMOUNT CONTROL

FIELD OF THE INVENTION

The present invention relates to image processors, and more particularly, to an algorithm for code amount control in moving image compression.

DESCRIPTION OF THE BACKGROUND ART

Code amount control is a technique to optimize an image quality by controlling a generated amount of code (see, for example, Patent Literatures 1 and 2 below). In existing code amount control algorithms, code amount control is generally performed GOP (Group Of Picture) by GOP or frame by frame. In code amount control of frame by frame, for example, an amount of code allotted for one frame is calculated, and a quantization parameter for each macroblock within the frame is controlled so as not to exceed the amount of code.

CITATION LIST

Patent Literature

Patent Literature 1: JP10-215460A
Patent Literature 2: JP10-243399A

SUMMARY OF THE INVENTION

Problems to be solved by the Invention

In code amount control targeting at amount of code of GOP by GOP or frame by frame, since an average section to obtain a target constant bit rate is long and therefore a comparatively great value is allowed for a peak value of a code amount, improvement in image quality is achieved. However, a long average section means a long buffering time, resulting in a great delay amount in encoding. Thus while code amount control performed GOP by GOP or frame by frame is suitable for applications without delay limit such as replay of recorded programs, it is not suitable for applications with rigid delay limit.

The present invention has been made in view of such situation, and is directed to obtaining an image processor that achieves reduction in delay amount, in comparison with code amount control performed GOP by GOP or frame by frame.

Means to Solve the Problems

An image processor according to a first aspect of the present invention includes an encoder that performs encoding including quantization on an image signal and a controller that controls a quantization parameter for the quantization. The controller determines a quantization parameter of a currently target macroblock as an increase or decrease from a reference value, and determines the increase or decrease based on a difference between a target amount of code for a predetermined number of macroblocks fewer than a total number of macroblocks within one frame and a generated amount of code of the predetermined number of macroblocks processed immediately before.

According to the image processor of the first aspect, the controller determines a quantization parameter of a currently target macroblock as an increase or decrease from a reference value, and determines the increase or decrease based on a difference between a target amount of code for a predetermined number of macroblocks fewer than a total number of macroblocks within one frame and a generated amount of code of the predetermined number of macroblocks processed immediately before. Thus reduction in delay amount is achieved, in comparison with code amount control performed GOP by GOP or frame by frame.

An image processor according to a second aspect of the present invention is the image processor according to the first aspect, wherein the controller further determines the increase or decrease, based on a minimum of activity evaluation values of four side areas of the currently target macroblock.

According to the image processor of the second aspect, the controller further determines the increase or decrease, based on a minimum of activity evaluation values of four side areas of the currently target macroblock. Thus even when a complex image is included in a part of a macroblock, the quantization parameter is prevented from being set at an excessively great value under the influence of the complex image.

An image processor according to a third aspect of the present invention is the image processor according to the first or second aspect, wherein the controller further determines the increase or decrease, based on a sum of absolute difference of a prediction error obtained by motion search of the currently target macroblock.

According to the image processor of the third aspect, the controller further determines the increase or decrease, based on a sum of absolute difference of a prediction error obtained by motion search of the currently target macroblock. Thus adequate setting of a quantization parameter is achieved based on the sum of absolute difference of the prediction error of the macroblock. When a macroblock has a sum of absolute difference of the prediction error smaller than a predetermined threshold, for example, it is determined that the area has a little amount of generated code, and such an adjustment is performed that the increase or decrease is reduced by a predetermined value.

An image processor according to a fourth aspect of the present invention is the image processor according to any one of the first to third aspects, wherein the controller further determines the increase or decrease, based on a generated amount of code of a previously processed macroblock.

According to the image processor of the fourth aspect, the controller further determines the increase or decrease, based on a generated amount of code of a previously processed macroblock. Thus when a generated amount of code of a previously processed macroblock is less than a target amount of code, a quantization parameter of a currently target macroblock is set at a smaller value to achieve improved image quality. In contrast, when the generated amount of code of the previously processed macroblock is more than the target amount of code, the quantization parameter of the currently target macroblock is set at a greater value to suppress a generated amount of code.

An image processor according to a fifth aspect of the present invention is the image processor according to the first aspect, wherein the controller further determines the increase or decrease, based on a difference between a target amount of code for a predetermined number of macroblocks and a generated amount of code of the predetermined number of macroblocks processed immediately before, and a predetermined attribute value of the currently target macroblock.

According to the image processor of the fifth aspect, the controller further determines the increase or decrease, based on the difference between a target amount of code for a predetermined number of macroblocks and a generated amount of code of the predetermined number of macroblocks processed immediately before, and a predetermined attribute value of the currently target macroblock. Thus adequate setting of a quantization parameter is achieved based on the difference between the target amount of code and the generated amount of code, and a predetermined attribute value. When a macroblock has an attribute that image degradation is noticeable, for example, the quantization parameter is set at a smaller value to achieve improved image quality, while when a macroblock has an attribute that image degradation is hardly noticeable, the quantization parameter is set at a greater value to suppress generated amount of code. Moreover, when the generated amount of code is less than the target amount of code (i.e., when there are allowances for amount of code), the quantization parameter is set at a smaller value to achieve improved image quality, while when the generated amount of code is more than the target amount of code (i.e., when there is few allowances for amount of code), the quantization parameter is set at a greater value to suppress the generated amount of code.

An image processor according to a sixth aspect of the present invention is the image processor according to the fifth aspect, wherein the controller determines the attribute value, based on a result of edge detection of the currently target macroblock.

According to the image processor of the sixth aspect, the controller determines the attribute value, based on a result of edge detection of the currently target macroblock. Thus when it is determined that a character is included in the macroblock as a result of edge detection, the attribute value is set at such a value that the quantization parameter becomes smaller to achieve improved image quality.

An image processor according to a seventh aspect of the present invention is the image processor according to the sixth aspect, wherein the controller further determines the attribute value, based on a minimum of activity evaluation values of four side areas of the currently target macroblock.

According to the image processor of the seventh aspect, the controller further determines the attribute value, based on a minimum of activity evaluation values of four side areas of the currently target macroblock. Thus when a complex image is included in a part of the macroblock, the attribute value set at such a value that the quantization parameter becomes smaller prevents the quantization parameter from being set at an excessively great value under the influence of the complex image.

An image processor according to an eighth aspect of the present invention is the image processor according to the sixth or seventh aspect, wherein the controller further determines the attribute value, based on an activity evaluation value of an entire area of the currently target macroblock.

According to the image processor of the eighth aspect, the controller further determines the attribute value, based on an activity evaluation value of an entire area of the currently target macroblock. Thus when the activity evaluation value is small, the attribute value is set at such a value that the quantization parameter becomes smaller to achieve improved image quality, while when the activity evaluation value is great, the attribute value is set at such a value that the quantization parameter becomes greater to suppress the generated amount of code.

An image processor according to a ninth aspect of the present invention is the image processor according to any one of the first to eighth aspects, wherein the controller, in increasing the quantization parameter of the currently target macroblock from a quantization parameter of a previously processed macroblock, employs a predetermined value as the reference value, when the reference value is smaller than the predetermined value.

According to the image processor of the ninth aspect, the controller, in increasing the quantization parameter of the currently target macroblock from a quantization parameter of a previously processed macroblock, employs a predetermined value as the reference value, when the reference value is smaller than the predetermined value. Thus since the quantization parameter is quickly increased, the generated amount of code is efficiently suppressed.

An image processor according to a 10-th aspect of the present invention is the image processor according to any one of the first to ninth aspects, wherein the controller, in decreasing the quantization parameter of the currently target macroblock from a quantization parameter of a previously processed macroblock, employs a predetermined value as the reference value, when the reference value is greater than the predetermined value.

According to the image processor of the 10-th aspect, the controller, in decreasing the quantization parameter of the currently target macroblock from a quantization parameter of a previously processed macroblock, employs a predetermined value as the reference value, when the reference value is greater than the predetermined value. Thus since the quantization parameter is quickly decreased, image quality is efficiently improved.

An image processor according to an 11-th aspect of the present invention is the image processor according to the ninth or 10-th aspect, wherein the predetermined value is set at a different value, depending on an activity evaluation value of an entire area of the currently target macroblock.

According to the image processor of the 11-th aspect, the predetermined value is set at a different value, depending on an activity evaluation value of an entire area of the currently target macroblock. Thus adequate setting of the predetermined value is achieved, depending on complexity of the image.

An image processor according to a 12-th aspect of the present invention is the image processor according to the ninth or 10-th aspect, wherein the predetermined value is set at a different value, depending on a predetermined attribute value of the currently target macroblock.

According to the image processor of the 12-th aspect, the predetermined value is set at a different value, depending on a predetermined attribute value of the currently target macroblock. Thus adequate setting of the predetermined value is achieved, depending on noticeability of image degradation.

An image processor according to a 13-th aspect of the present invention is the image processor according to the ninth, 10-th, or 12-th aspect, wherein the predetermined value is set at a different value, depending on a difference between a target amount of code for a predetermined number of macroblocks and a generated amount of code of the predetermined number of macroblocks processed immediately before.

According to the image processor of the 13-th aspect, the predetermined value is set at a different value, depending on a difference between a target amount of code for a predetermined number of macroblocks and a generated amount of code of the predetermined number of macroblocks processed immediately before. Thus adequate setting of the predetermined value is achieved, depending on allowance for the amount of code.

An image processor according to a 14-th aspect of the present invention is the image processor according to any one of the first to 13-th aspects, wherein the controller further determines the increase or decrease, based on a generated amount of code in an area corresponding to the currently target macroblock within a previously processed frame.

According to the image processor of the 14-th aspect, the controller further determines the increase or decrease, based on a generated amount of code in an area corresponding to the currently target macroblock within a previously processed frame. Thus since the areas whose quantization parameter is set at a great value are prevented from being concentrated in the same place within a frame, image degradation due to continuous occurrence of such areas within multiple frames is prevented.

An image processor according to a 15-th aspect of the present invention is the image processor according to any one of the first to 13-th aspects, wherein the controller further determines the increase or decrease, based on occurrence of character areas within multiple macroblocks ahead of the currently target macroblock.

According to the image processor of the 15-th aspect, the controller further determines the increase or decrease, based on occurrence of character areas within multiple macroblocks ahead of the currently target macroblock. Thus when it is expected that many character areas will occur ahead, the quantization parameter of the currently target macroblock is set at a large value to suppress the generated amount of code in advance so that prospective exceptional processing is suppressed.

An image processor according to a 16-th aspect of the present invention is the image processor according to any one of the first to 15-th aspects, wherein the macroblocks include intra macroblocks.

According to the image processor of the 16-th aspect, the macroblocks include intra macroblocks. Thus the same code amount control is performable on the intra macroblocks.

An image processor according to a 17-th aspect of the present invention is the image processor according to the 16-th aspect, wherein a quantization parameter of the intra macroblocks has a predetermined upper limit.

According to the image processor of the 17-th aspect, a quantization parameter of the intra macroblocks has a predetermined upper limit. With the intra macroblocks, image degradation tends to be noticeable when the quantization parameter is set at a great value, and therefore providing the upper limit for the quantization parameter of the intra macroblocks suppresses image degradation.

An image processor according to an 18-th aspect of the present invention is the image processor according to any one of the first to 17-th aspects, wherein the controller, when a generated amount of code of a predetermined number of macroblocks processed immediately before exceeds a predetermined threshold to be set depending on a maximum allowable amount of code, sets the quantization parameter of the currently target macroblock at a value obtained by adding a constant value to a quantization parameter of a previously processed macroblock.

According to the image processor of the 18-th aspect, the controller, when a generated amount of code of a predetermined number of macroblocks processed immediately before exceeds a predetermined threshold to be set depending on a maximum allowable amount of code, sets the quantization parameter of the currently target macroblock at a value obtained by adding a constant value to a quantization parameter of a previously processed macroblock. In this way, exceptional processing to forcibly set the quantization parameter at a greater value when the generated amount of code exceeds the threshold helps to prevent the generated amount of code from exceeding the maximum allowable amount of code.

Effects of the Invention

The present invention achieves reduction in delay amount, in comparison with code amount control performed GOP by GOP or frame by frame.

These and other objects, features, aspects and advantages of the present invention will become more apparent from the following detailed description of the present invention when taken in conjunction with the accompanying drawings.

BRIEF DESCRIPTION OF DRAWINGS

FIG. 12 is a diagram illustrating an example of how a predetermined value is determined.

FIG. 13 is a diagram illustrating an example of how the predetermined value is determined.

DESCRIPTION OF THE INVENTION

Figure 1:
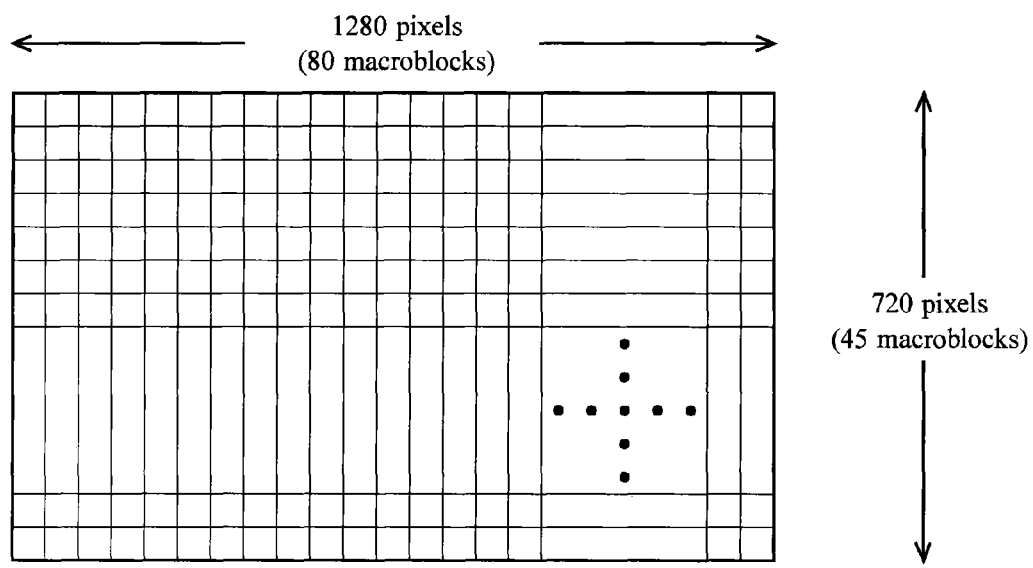
FIG. 1 is a diagram illustrating an example of encoding macroblock by macroblock.

Embodiments of the present invention are described in detail below referring to the drawings. It should be noted that identical reference numerals throughout the drawings indicate identical or equivalent elements.

Embodiment 1.

FIG. 1 is a diagram illustrating an example of encoding macroblock by macroblock. FIG. 1 shows an example of an image of one frame having 1280 pixels in row (horizontally) and 720 pixels in column (vertically). One frame is divided into macroblocks for each 16 pixels in row and for each 16 pixels in column. Thus one frame is divided into 80 macroblocks in row and 45 macroblocks in column. A group of 80 macroblocks equivalent of one row is referred to as macroblock line.

Figure 2:
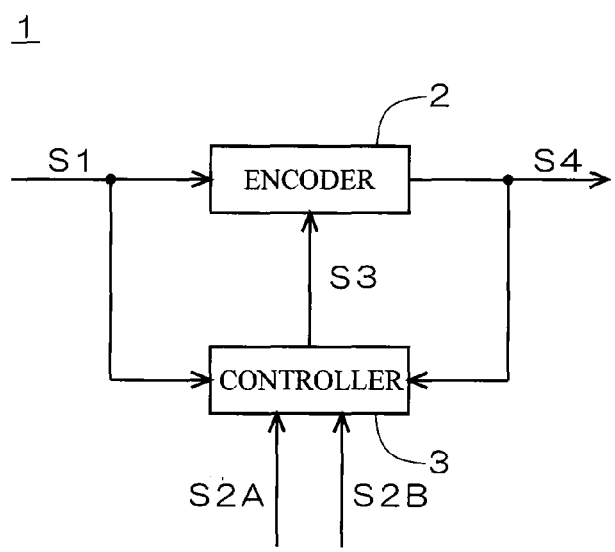
FIG. 2 is a block diagram illustrating a configuration of an image processor according to the present invention.

FIG. 2 is a block diagram illustrating a configuration of an image processor 1 according to Embodiment 1 of the present invention. As illustrated in FIG. 2, the image processor 1 includes an encoder 2 and a controller 3. The encoder 2 is in conformity to standards for a moving image such as MPEG-2 and MPEG-4, and performs image processing such as quantization and encoding on an image signal S1 that is before compression coding to output an image signal S4 on which compression coding has been performed. The image signal S4 is transmitted from the image processor 1 to a display device (not illustrated) by a wireless LAN or the like, and the display device displays a moving image.

The controller 3 receives an input of the image signals S1 and S4, and also an input of a signal S2A indicating a maximum allowable amount of code for one macroblock and a signal S2B indicating a target amount of code for one macroblock. The maximum allowable amount of code for one macroblock is calculated based on a maximum bit rate (for example, 18 Mbps) from the image processor 1 to the display device, a frame rate (for example, 60 fps) of the moving image, and a total number (for example, 3600) of macroblocks within one frame. Similarly, the target amount of code for one macroblock is calculated based on a target bit rate (for example, 14 Mbps) from the image processor 1 to the display device, the frame rate of the moving image, and the total number of macroblocks within one frame. The controller 3 controls the quantization parameter for quantization in the encoder 2 with a control signal S3, based on the signals S1, S2A, S2B, and S4.

Figure 3:
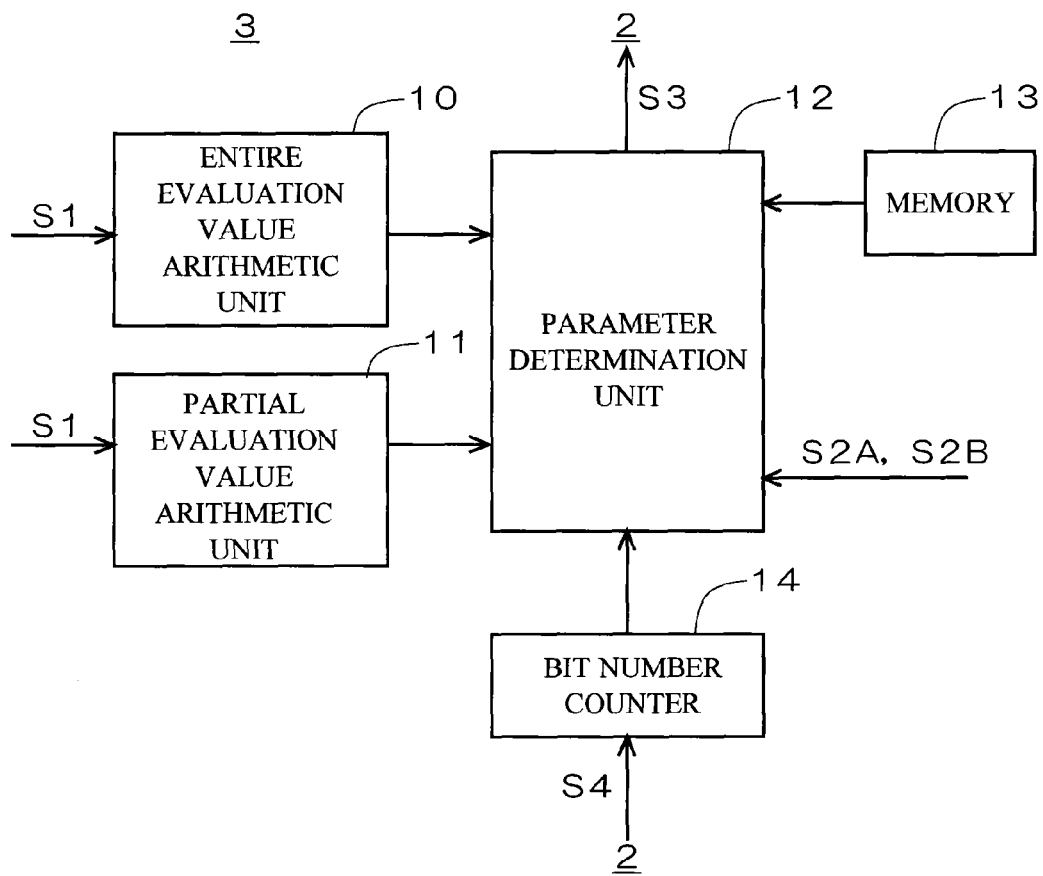
FIG. 3 is a block diagram illustrating a first example of the configuration of a controller illustrated in FIG. 2.

FIG. 3 is a block diagram illustrating a first example of the configuration of the controller 3 illustrated in FIG. 2. As illustrated in FIG. 3, the controller 3 includes an entire evaluation value arithmetic unit 10, a partial evaluation value arithmetic unit 11, a parameter determination unit 12, a memory 13, and a bit number counter 14. The image signal S1 is inputted to the entire evaluation value arithmetic unit 10 and the partial evaluation value arithmetic unit 11. The signals S2A and S2B are inputted to the parameter determination unit 12. The image signal S4 is inputted to the bit number counter 14. The control signal S3 is outputted from the parameter determination unit 12.

The entire evaluation arithmetic unit 10 calculates an activity evaluation value ACT1 (details are described below) of the entire area of a currently target macroblock based on the image signal S1. The partial evaluation value arithmetic unit 11 calculates a minimum ACT2 of activity evaluation values (details are described below) of multiple partial areas of the currently target macroblock, based on the image signal S1. The memory 13 holds data regarding below-described various values such as a threshold and a constant. The bit number counter 14 obtains a generated amount of code based on the image signal S4.

The operation of the image processor 1 according to the present embodiment is illustrated below. The parameter determination unit 12 determines a quantization parameter QP1. of a currently target macroblock as an increase or decrease QP3 from a reference value QP2. That is, the parameter determination unit 12 computes QP1=QP2+QP3 to obtain the quantization parameter QP1.

The parameter determination unit 12 uses an average of quantization parameters of one macroblock line traced back from the currently target macroblock as the reference value QP2. For the macroblock at the forefront, a predetermined constant value is used as the reference value QP2. When a total number of processed macroblocks is fewer than one macroblock line, an average of quantization parameters of the processed macroblocks is used as the reference value QP2.

The parameter determination, unit 12 also computes QP3=QP3A+QP3B+QP3C to obtain the increase or decrease QP3.

Figure 4:
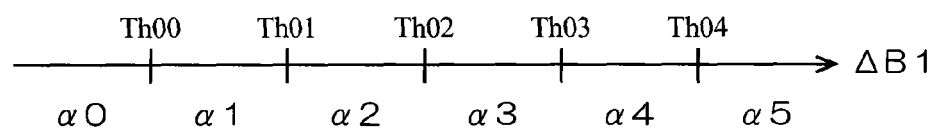
FIG. 4 is a diagram illustrating an example of how an increase or decrease is determined.

Specifically, the parameter determination unit 12 determines the increase or decrease QP3A, based on a difference between a target amount of code for one macroblock line and a generated amount of code of one macroblock line processed immediately before (ΔB1=generated amount of code−target amount,of code). FIG. 4 is a diagram illustrating an example of how the increase or decrease QP3A is determined. When the difference ΔB1 is smaller than a threshold Th00 (for example, −1000 bits), the increase or decrease QP3A is set at a value α0 (for example, −4). When the difference ΔB1 is equal to or greater than the threshold Th00 and smaller than a threshold Th01 (for example, −500 bits), the increase or decrease QP3A is set at a value α1 (for example, −2). When the difference ΔB1 is equal to or greater than the threshold Th01 and smaller than a threshold Th02 (for example, 0 bit), the increase or decrease QP3A is set at a value α2 (for example, −1). When the difference ΔB1 is equal to or greater than the threshold Th02 and smaller than a threshold Th03 (for example, 500 bits), the increase or decrease QP3A is set at a value α3 (for example, 1). When the difference ΔB1 is equal to or greater than the threshold Th03 and smaller than a threshold Th04 (for example, 1000 bits), the increase or decrease QP3A is set at a value α4 (for example, 2). When the difference ΔB1 is equal to or greater than the threshold Th04, the increase or decrease QP3A is set at a value α5 (for example, 4).

Figure 5:
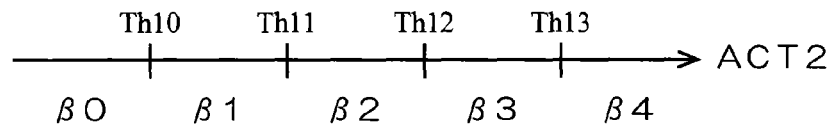
FIG. 5 is a diagram illustrating an example of how the increase or decrease is determined.

The parameter determination unit 12 determines the increase or decrease QP3B, based on the minimum (ACT2) of the activity evaluation values of the four side areas (that is, 4 pixels in column×16 pixels in row of an area including the upper side, 4 pixels in column×16 pixels in row of an area including the base, 16 pixels in column×4 pixels in row of an area including the left side, and 16 pixels in column×4 pixels in row of an area including the right side) of the currently target macroblock. FIG. 5 is a diagram illustrating an example of how the increase or decrease QP3B is determined. When the minimum ACT2 is smaller than a threshold Th10 (for example, 2), the increase or decrease QP3B is set at a value β0 (for example, −4). When the minimum ACT2 is equal to or greater than the threshold Th10 and smaller than a threshold Th11 (for example, 5), the increase or decrease QP3B is set at a value β1 (for example, −2). When the minimum ACT2 is equal to or greater than the threshold Th11 and smaller than a threshold Th12 (for example, 10), the increase or decrease QP3B is set at a value β2 (for example, 0). When the minimum ACT2 is equal to or greater than the threshold Th12 and smaller than a threshold Th13 (for example, 30), the increase or decrease QP3B is set at a value β3 (for example, 2). When the minimum ACT2 is equal to or greater than the threshold Th13, the increase or decrease QP3B is set at a value β4 (for example, 4). The activity evaluation value is an index (pixel information) which indicates variability in pixel values within a macroblock, obtained by, for example, dividing a sum of absolute differences between an average luminance value and luminance values of each pixel of the macroblock by the number of pixels within the macroblock.

Figure 6:
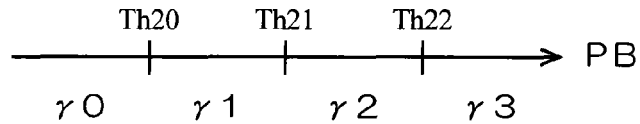
FIG. 6 is a diagram illustrating an example of how the increase or decrease is determined

The parameter determination unit 12 determines the increase or decrease QP3C, based on a generated amount of code (PB) of a previously processed macroblock. FIG. 6 is a diagram illustrating an example of how the increase or decrease QP3C is determined. When the generated amount of code PB is less than a threshold Th20 (for example, 1/2 of the target amount of code for one macroblock), the increase or decrease QP3C is set at a value γ0 (for example, −2). When the generated amount of code PB is equal to or more than the threshold Th20 and less than a threshold Th21 (for example, the target amount of code), the increase or decrease QP3C is set at a value γ1 (for example, −1). When the generated amount of code PB is equal to or more than the threshold Th21 and less than a threshold Th22 (for example, 3/2 of the target amount of code), the increase or decrease QP3C is set at a value γ2 (for example, 1). When the generated amount of code PB is equal to or more than the threshold Th22, the increase or decrease QP3C is set at a value γ3 (for example, 2).

As described above, the parameter determination unit 12 determines the quantization parameter QP1 of the currently target macroblock as the increase or decrease QP3 from the reference value QP2. In increasing the quantization parameter of the currently target macroblock from the quantization parameter of the previously processed macroblock, the parameter determination unit 12 employs a predetermined value K1 as the reference value QP2, when the reference value QP2 is smaller than the predetermined value K1. Similarly, in decreasing the quantization parameter of the currently target macroblock from the quantization parameter of the previously processed macroblock, the parameter determination unit 12 employs a predetermined value K2 as the reference value QP2, when the reference value QP2 is greater than the predetermined value K2.

The predetermined values K1 and K2 are set at a different value, depending on the activity evaluation value (ACT1) of the entire area of the currently target macroblock. The predetermined value K1 is set, for example, at 20 when the activity evaluation value ACT1 is smaller than 5, at 25 when equal to or greater than 5 and smaller than 10, and at 30 when equal to or greater than 10, respectively. The predetermined value K2 is set, for example, at 25 when the activity evaluation value ACT1 is smaller than 5, and at 51 when equal to or greater than 5.

Target macroblocks to be processed by the image processor 1 include intra macroblocks (macroblocks for which inter-frame prediction is not employed) at a predetermined rate (for example, at a rate of one or two per one macroblock line). The quantization parameter of the intra macroblocks has a predetermined upper limit QPM (for example, 30). When the currently target macroblock is an intra macroblock and when the quantization parameter QP1 determined in accordance with the above algorithm exceeds the upper limit QPM, the parameter determination unit 12 sets the quantization parameter of the intra macroblock at the upper limit QPM.

Furthermore, when the generated amount of code of a predetermined number of macroblocks (for example, 15 macroblock lines equivalent of allowable transit delay) processed immediately before exceeds a predetermined threshold to be set depending on the maximum allowable amount of code (for example, 98% of the maximum allowable amount of code), the parameter determination unit 12 does not determine the quantization parameter in accordance with the above algorithm, but performs a predetermined exceptional processing. Specifically, the parameter determination unit 12 sets the quantization parameter of the currently target macroblock at a value obtained by adding a constant value (for example, 2) to the quantization parameter of the previously processed macroblock. The exceptional processing continues until the generated amount of code gets equal to or less than the threshold.

Figure 7:
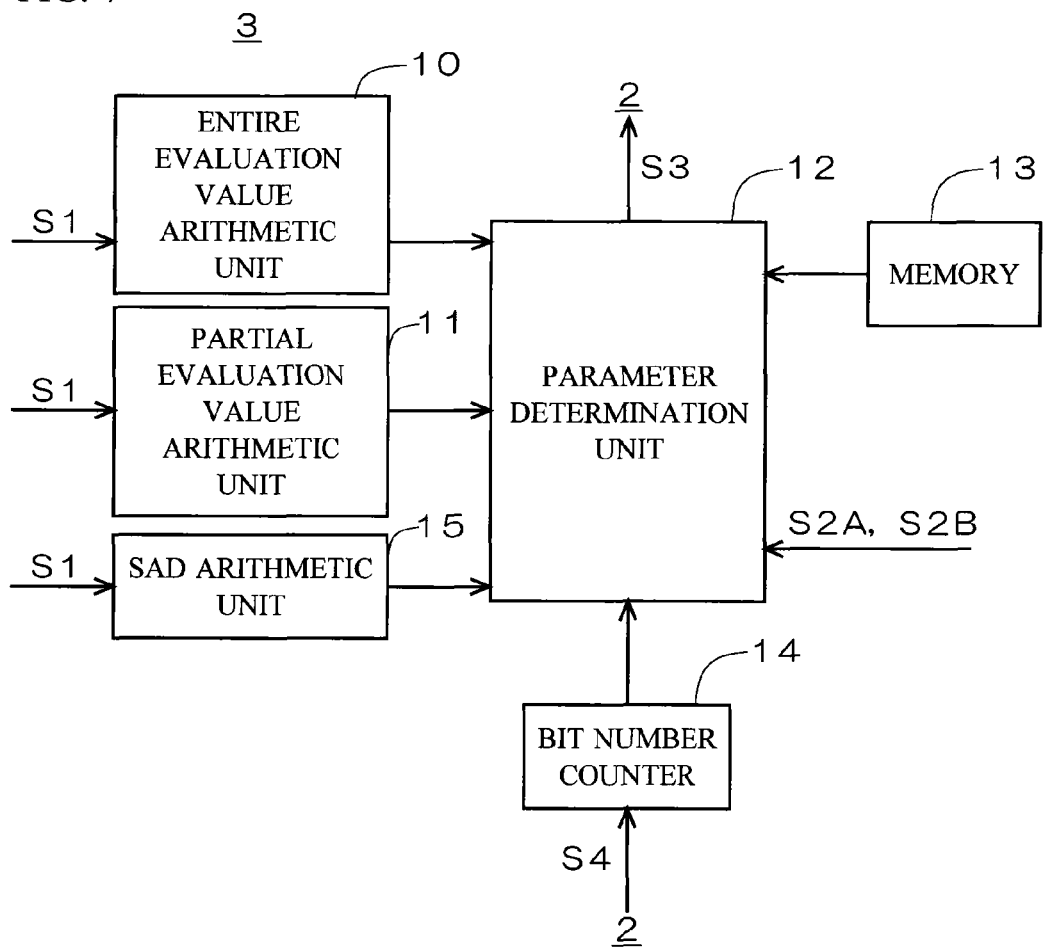
FIG. 7 is a block diagram illustrating a second example of the configuration of the controller illustrated in FIG. 2.
Figure 8:
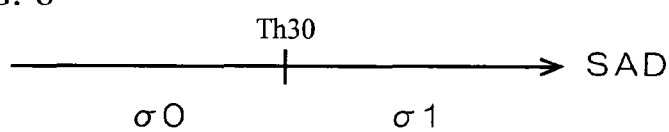
FIG. 8 is a diagram illustrating an example of how the increase or decrease is determined.

FIG. 7 is a block diagram illustrating a second example of the configuration of the controller 3 illustrated in FIG. 2. An SAD arithmetic unit 15 is added to the configuration illustrated in FIG. 3. The SAD arithmetic unit 15 calculates a sum of absolute difference (SAD) of a prediction error obtained by motion search of the macroblock for the currently target macroblock. The parameter determination unit 12 adjusts the increase or decrease QP3, based on the sum of absolute difference SAD of the prediction error of the currently target macroblock. FIG. 8 is a diagram illustrating an example of how the increase or decrease QP3 is adjusted. A threshold Th30 (for example, 500) is preset for the sum of absolute difference SAD of the prediction error, and when the sum of absolute difference SAD of the prediction error of the currently target macroblock is smaller than the threshold Th30, the parameter determination unit 12 adds a predetermined value σ0 (for example, −3) to the increase or decrease QP3 obtained in accordance with the above algorithm. When the sum of absolute difference SAD of the prediction error is equal to or greater than the threshold Th30, a predetermined value σ1 (for example, 0) is added to the increase or decrease QP3. Other processing by the parameter determination unit 12 is the same as above.

As described above, in the image processor 1 according to the present embodiment, the controller 3 determines the quantization parameter QP1 of the currently target macroblock as the increase or decrease QP3 from the reference value QP2, and determines the increase or decrease QP3A based on the difference ΔB1 between the target amount of code for a predetermined number of macroblocks fewer than the total number of macroblocks within one frame (in the above example, one macroblock line) and the generated amount of code of the same predetermined number of macroblocks processed immediately before. Thus reduction in delay amount is achieved, in comparison with code amount control performed GOP by GOP or frame by frame.

Also in the image processor 1 according to the present embodiment, the controller 3 determines the increase or decrease QP3B, based on the minimum ACT2 of the activity evaluation values of the four side areas of the currently target macroblock. Thus even when a complex image is included in a part of a macroblock, the quantization parameter QP1 is prevented from being set at an excessively great value under the influence of the complex image.

Also in the image processor 1 according to the present embodiment, the controller 3 adjusts the increase or decrease QP3, based on the sum of absolute difference SAD of the prediction error obtained by motion search of the currently target macroblock. Thus adequate setting of a quantization parameter is achieved based on the sum of absolute difference SAD of the prediction error of the macroblock. When a macroblock has a sum of absolute difference SAD of the prediction error smaller than the predetermined threshold Th30, for example, it is determined that the area has a little amount of generated code, and such an adjustment is performed that the increase or decrease QP3 is reduced by a predetermined value.

Also in the image processor 1 according to the present embodiment, the controller 3 determines the increase or decrease QP3C based on the generated amount of code PB of the previously processed macroblock. Thus when the generated amount of code of the previously processed macroblock is less than the target amount of code, the quantization parameter QP1 of the currently target macroblock is set at a smaller value to achieve improved image quality. In contrast, when the generated amount of code of the previously processed macroblock is more than the target amount of code, the quantization parameter QP1 of the currently target macroblock is set at a greater value to suppress the generated amount of code.

Also in the image processor 1 according to the present embodiment, the controller 3, in increasing the quantization parameter QP1 of the currently target macroblock from the quantization parameter of the previously processed macroblock, employs a predetermined value K1 as the reference value QP2, when the reference value QP2 is smaller than the predetermined value K1. Thus since the quantization parameter is quickly increased, the generated amount of code is efficiently suppressed.

Also in the image processor 1 according to the present embodiment, the controller 3, in decreasing the quantization parameter QP1 of the currently target macroblock from the quantization parameter of the previously processed macroblock, employs a predetermined value K2 as the reference value QP2, when the reference value QP2 is greater than the predetermined value K2. Thus since the quantization parameter is quickly decreased, image quality is efficiently improved.

Also in the image processor 1 according to the present embodiment, the predetermined values K1 and K2 are set at a different value, depending on the activity evaluation value ACT1 of the entire area of the currently target macroblock. Thus adequate setting of the predetermined values K1 and K2 is achieved, depending on complexity of the image.

Also in the image processor 1 according to the present embodiment, the target macroblocks include intra macroblocks. Thus the same code amount control is performable on the intra macroblocks.

Also in the image processor 1 according to the present embodiment, the quantization parameter of the intra macroblocks has a predetermined upper limit QPM. With the intra macroblock, image degradation tends to be noticeable when the quantization parameter is set at a great value, and therefore providing the upper limit QPM for the quantization parameter of the intra macroblock suppresses image degradation.

Also in the image processor 1 according to the present embodiment, the controller 3, when the generated amount of code of a predetermined number of macroblocks (15 macroblock lines in the above example) processed immediately before exceeds a predetermined threshold to be set depending on the maximum allowable amount of code, sets the quantization parameter of the currently target macroblock at a value obtained by adding a constant value to the quantization parameter of the previously processed macroblock. In this way, exceptional processing to forcibly set the quantization parameter at a greater value when the generated amount of code exceeds the threshold helps to prevent the generated amount of code from exceeding the maximum allowable amount of code.

Embodiment 2.

Figure 9:
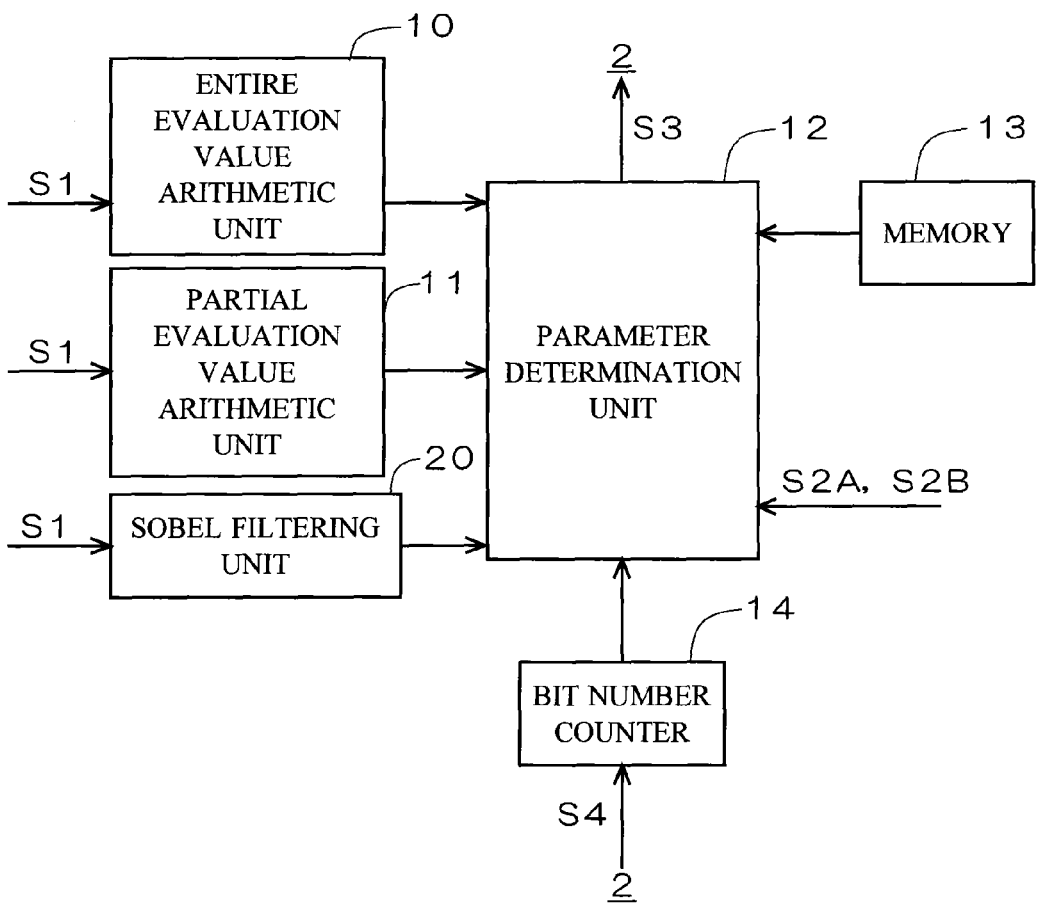
FIG. 9 is a block diagram illustrating a third example of the configuration of the controller illustrated in FIG. 2.

FIG. 9 is a block diagram illustrating a third example of the configuration of the controller 3 illustrated in FIG. 2. A Sobel filtering unit 20 is added to the configuration illustrated in FIG. 3. The Sobel filtering unit 20 performs edge detection on a currently target macroblock with a Sobel filter.

The operation of the image processor 1 according to the present embodiment is illustrated below. Similar to the above, the parameter determination unit 12 determines the quantization parameter QP1 of the currently target macroblock as an increase or decrease Q4 from the reference value QP2. That is, the parameter determination unit 12 computes QP1=QP2+QP4 to obtain the quantization parameter QP1.

Similarly to the above Embodiment 1, the parameter determination unit 12 uses an average of quantization parameters of one macroblock line traced back from the currently target macroblock as the reference value QP2. For the macroblock at the forefront, a predetermined constant value is used as the reference value QP2. When a total number of processed macroblocks is fewer than one macroblock line, an average of quantization parameters of the processed macroblocks is used as the reference value QP2.

The parameter determination unit 12 also computes QP4=QP4A+QP4B to obtain the increase or decrease QP4.

Specifically, the parameter determination unit 12 determines the increase or decrease QP4A (equivalent of the increase or decrease QP3A in the above Embodiment 1), based on a difference between a target amount of code for one macroblock line and a generated amount of code of one macroblock line processed immediately before (ΔB1=generated amount of code−target amount of code).

Figure 10:
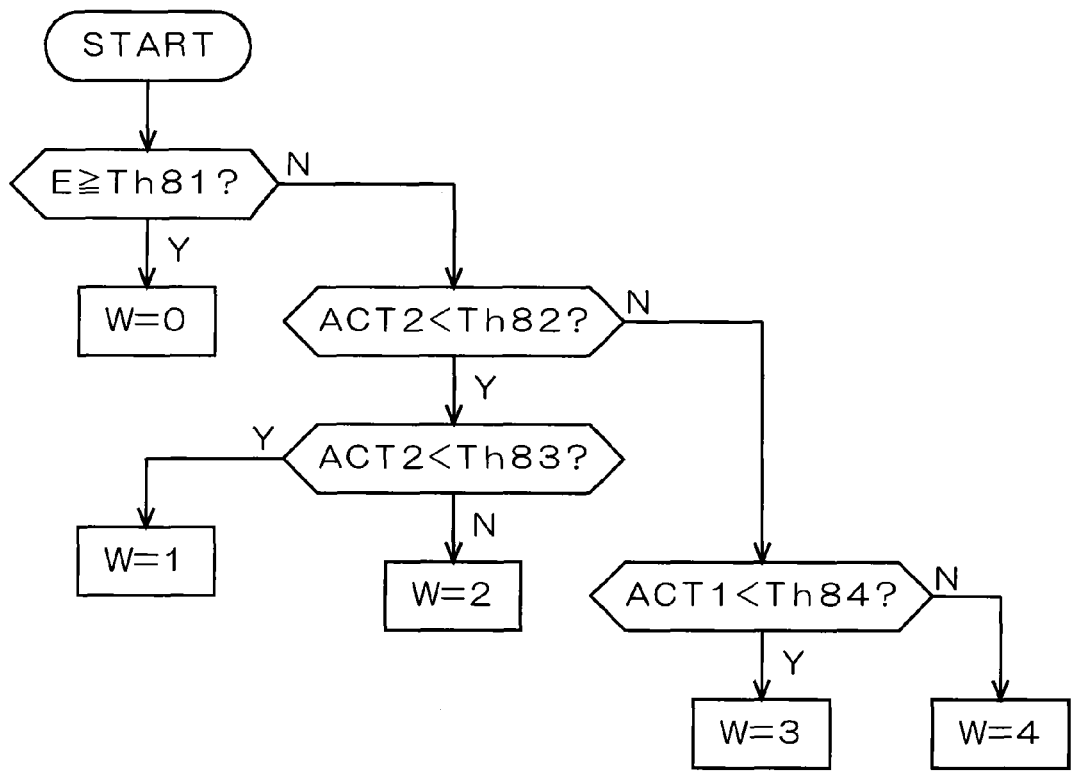
FIG. 10 is a flow chart illustrating an example of how an attribute value is determined.

The parameter determination unit 12 also obtains a difference between a target amount of code for, for example, 15 macroblock lines, that is equivalent of allowable transit delay and a generated amount of code of 15 macroblock lines processed immediately before (ΔB2=generated amount of code−target amount of code). Furthermore, the parameter determination unit 12 determines an attribute value W of the currently target macroblock, based on an edge determination value E, which is a result of Sobel filtering, the above activity evaluation value ACT1, and the above minimum ACT2. FIG. 10 is a flow chart illustrating an example of how the attribute value W is determined. As illustrated in FIG. 10, when the edge determination value E is equal to or greater than a threshold Th81, it is determined that the macroblock is a character area, and the attribute value W=0. When the minimum ACT2 is smaller than a threshold Th83, it is determined that the macroblock is an area where image degradation is highly noticeable, and the attribute value W=1. When the minimum ACT2 is equal to or greater than the threshold Th83 and smaller than a threshold Th82, it is determined that the macroblock is an area where image degradation is noticeable, and the attribute value W=2. When the activity evaluation value ACT1 is smaller than a threshold Th84, it is determined that the macroblock is an area where image degradation is not very noticeable, and the attribute value W=3. When the activity evaluation value ACT1 is equal to or greater than the threshold Th84, it is determined that the macroblock is an area where image degradation is hardly noticeable, and the attribute value W=4.

Figure 11:
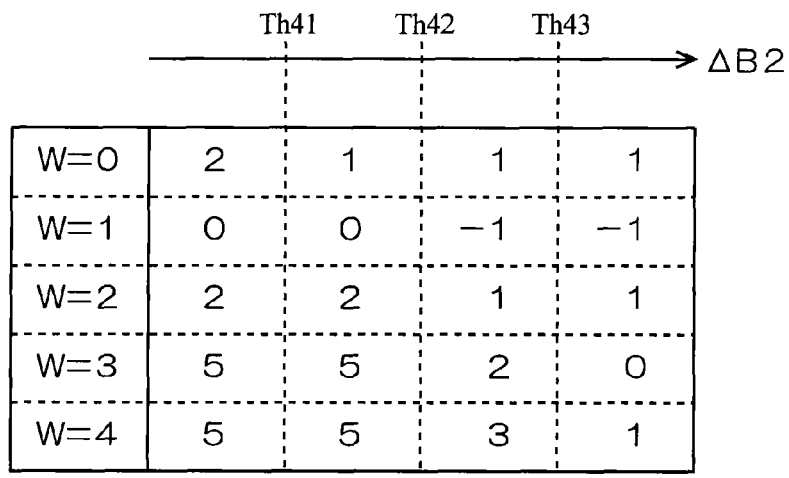
FIG. 11 is a diagram illustrating an example of how the increase or decrease is determined.

Then the parameter determination unit 12 determines the increase or decrease QP4B based on the difference ΔB2 and the attribute value W. FIG. 11 is a diagram illustrating an example of how the increase or decrease QP4B is determined. For example, for macroblocks where the attribute value W=0, the increase or decrease QP4B is set at 2, for example, when the difference ΔB2 is smaller than a threshold Th41, and at 1, for example, when the difference ΔB2 is equal to or greater than the threshold Th41. For another example, for macroblocks where the attribute value W=4, the increase or decrease QP4B is set at 5, for example, when the difference ΔB2 is smaller than a threshold Th42, at 3, for example, when the difference ΔB2 is equal to or greater than the threshold Th42 and smaller than a threshold Th43, and at 1, for example, when the difference ΔB2 is equal to or greater than a threshold Th43.

As described above, the parameter determination unit 12 determines the quantization parameter QP1 of the currently target macroblock as the increase or decrease QP4 from the reference value QP2. In increasing the quantization parameter of the currently target macroblock from the quantization parameter of the previously processed macroblock, the parameter determination unit 12 employs a predetermined value K3 as the reference value QP2, when the reference value QP2 is smaller than the predetermined value K3. Similarly, in decreasing the quantization parameter of the currently target macroblock from the quantization parameter of the previously processed macroblock, the parameter determination unit 12 employs a predetermined value K4 as the reference value QP2, when the reference value QP2 is greater than the predetermined value K4.

The predetermined values K3 and K4 are set at a different value, depending on the difference ΔB2 and the attribute value W. FIG. 12 is a diagram illustrating an example of how the predetermined value K3 is determined. For example, for macroblocks where the attribute value W=0, the predetermined value K3 is set at 20, for example, regardless of the difference ΔB2. For another example, for macroblocks where the attribute value W=4, the predetermined value K3 is set at 40, for example, when the difference ΔB2 is smaller than a threshold Th51, at 30, for example, when the difference ΔB2 is equal to or greater than the threshold Th51 and smaller than a threshold Th52, and at 20, for example, when the difference ΔB2 is equal to or greater than the threshold Th52. FIG. 13 is a diagram illustrating an example of how the predetermined value K4 is determined. For example, for macroblocks where the attribute value W=0, the predetermined value K4 is set at 51, for example, when the difference ΔB2 is smaller than a threshold Th61, at 40, for example, when the difference ΔB2 is equal to or greater than the threshold Th61 and smaller than a threshold Th62, and at 35, for example, when the difference ΔB2 is equal to or greater than the threshold Th62. For another example, for macroblocks where the attribute value W=4, the predetermined value K4 is set at 51, for example, regardless of the difference ΔB2.

Furthermore, the parameter determination unit 12 corrects the increase or decrease QP4, based on a generated amount of code in the area corresponding to the currently target macroblock within the previously processed frame. Specifically, when the generated amount of code of the macroblock in the same place of one frame before exceeds the target amount of code, a constant value (for example, 6) is added to the increase or decrease QP4 obtained for the currently target macroblock. This correction is also applicable to the above Embodiment 1.

The parameter determination unit 12 also corrects the increase or decrease QP4, based on occurrence of character areas within multiple macroblocks ahead of the currently target macroblock. Specifically, occurrence rate of character areas of multiple macroblocks (for example, one macroblock line) ahead of the currently target macroblock within the same frame is obtained based on the result of Sobel filtering. When the occurrence rate exceeds a predetermined threshold, a constant value (for example, 5) is added to the increase or decrease QP4 obtained for the currently target macroblock. This correction is also applicable to the above Embodiment 1.

Similar to the above Embodiment 1, target macroblocks to be processed by the image processor 1 include intra macroblocks at a predetermined rate. The quantization parameter of the intra macroblocks has a predetermined upper limit QPM (for example, 30). When the currently target macroblock is an intra macroblock and when the quantization parameter QP1 determined in accordance with the above algorithm exceeds the upper limit QPM, the parameter determination unit 12 sets the quantization parameter of the intra macroblock at the upper limit QPM.

Furthermore, similar to the above Embodiment 1, when the generated amount of code of a predetermined number of macroblocks (for example, 15 macroblock lines) processed immediately before exceeds a predetermined threshold to be set depending on the maximum allowable amount of code (for example, 98% of the maximum allowable amount of code), the parameter determination unit 12 does not determine the quantization parameter in accordance with the above algorithm, but performs predetermined exceptional processing. Specifically, the parameter determination unit 12 sets the quantization parameter of the currently target macroblock at a value obtained by adding a constant value (for example, 2) to the quantization parameter of the previously processed macroblock. The exceptional processing continues until the generated amount of code gets equal to or less than the threshold.

As described above, in the image processor 1 according to the present embodiment, the controller 3 determines the quantization parameter QP1 of the currently target macroblock as the increase or decrease QP4 from the reference value QP2, and determines the increase or decrease QP4A based on the difference ΔB1 between the target amount of code for a predetermined number of macroblocks fewer than the total number of macroblocks within one frame (in the above example, one macroblock line) and the generated amount of code of the same predetermined number of macroblocks processed immediately before. Thus reduction in delay amount is achieved, in comparison with code amount control performed GOP by GOP or frame by frame.

Also in the image processor 1 according to the present embodiment, the controller 3 determines the increase or decrease QP4B, based on the difference ΔB2 between the target amount of code for a predetermined number of macroblocks (in the above example, 15 macroblock lines) and the generated amount of code of the same predetermined number of macroblocks processed immediately before, and a predetermined attribute value W of the currently target macroblock. Thus adequate setting of a quantization parameter is achieved based on the difference ΔB2 between the target amount of code and the generated amount of code, and a predetermined attribute value W. When a macroblock has an attribute that image degradation is noticeable, for example, the quantization parameter is set at a smaller value to achieve improved image quality, while when a macroblock has an attribute that image degradation is hardly noticeable, the quantization parameter is set at a greater value to suppress generated amount of code. Moreover, when the generated amount of code is less than the target amount of code (i.e., when there are allowances for amount of code), the quantization parameter is set at a smaller value to achieve improved image quality, while when the generated amount of code is more than the target amount of code (i.e., when there is few allowances for amount of code), the quantization parameter is set at a greater value to suppress the generated amount of code.

Also in the image processor 1 according to the present embodiment, the controller 3 determines the attribute value W, based on a result of edge detection of the currently target macroblock. Thus when it is determined that a character is included in the macroblock as a result of edge detection, the attribute value W is set at such a value that the quantization parameter becomes smaller to achieve improved image quality.

Also in the image processor 1 according to the present embodiment, the controller 3 determines the attribute value W, based on the minimum ACT2 of the activity evaluation values of the four side areas of the currently target macroblock. Thus when a complex image is included in a part of the macroblock, the attribute value W set at such a value that the quantization parameter becomes smaller prevents the quantization parameter from being set at an excessively great value under the influence of the complex image.

Also in the image processor 1 according to the present embodiment, the controller 3 determines the attribute value W, based on the activity evaluation value ACT 1 of the entire area of the currently target macroblock. Thus when the activity evaluation value ACT1 is small, the attribute value W is set at such a value that the quantization parameter becomes smaller to achieve improved image quality, while when the activity evaluation value ACT1 is great, the attribute value W is set at such a value that the quantization parameter becomes greater to suppress the generated amount of code.

Also in the image processor 1 according to the present embodiment, the controller 3, in increasing the quantization parameter QP1 of the currently target macroblock from the quantization parameter of the previously processed macroblock, employs the predetermined value K3 as the reference value QP2, when the reference value QP2 is smaller than the predetermined value K3. Thus since the quantization parameter is quickly increased, the generated amount of code is efficiently suppressed.

Also in the image processor 1 according to the present embodiment, the controller 3, in decreasing the quantization parameter QP1 of the currently target macroblock from the quantization parameter of the previously processed macroblock, employs the predetermined value K4 as the reference value QP2, when the reference value QP2 is greater than the predetermined value K4. Thus since the quantization parameter is quickly decreased, image quality is efficiently improved.

Also in the image processor 1 according to the present embodiment, the predetermined values K3 and K4 are set at a different value, depending on the predetermined attribute value W of the currently target macroblock. Thus adequate setting of the predetermined values K3 and K4 is achieved, depending on noticeability of image degradation.

Also in the image processor 1 according to the present embodiment, the predetermined values K3 and K4 are set at a different value, depending on the difference ΔB2 between the target amount of code for a predetermined number of macroblocks (in the above example, 15 macroblock lines) and the generated amount of code of the same predetermined number of macroblocks processed immediately before. Thus adequate setting of the predetermined values K3 and K4 is achieved, depending on allowance for the amount of code.

Also in the image processor 1 according to the present embodiment, the controller 3 determines the increase or decrease QP4, based on the generated amount of code in the area corresponding to the currently target macroblock within the previously processed frame. Thus since the areas whose quantization parameter is set at a great value are prevented from being concentrated in the same place within a frame, image degradation due to continuous occurrence of such areas within multiple frames is prevented.

Also in the image processor 1 according to the present embodiment, the controller 3 determines the increase or decrease QP4, based on occurrence of character areas within multiple macroblocks (in the above example, one macroblock line) ahead of the currently target macroblock. Thus when it is expected that many character areas will occur ahead, the quantization parameter of the currently target macroblock is set at a large value to suppress the generated amount of code in advance so that prospective exceptional processing is suppressed.

Also in the image processor 1 according to the present embodiment, the target macroblocks include intra macroblocks. Thus the same code amount control is performable on the intra macroblocks.

Also in the image processor 1 according to the present embodiment, the quantization parameter of the intra macroblocks has a predetermined upper limit QPM. With the intra macroblock, image degradation tends to be noticeable when the quantization parameter is set at a great value, and therefore providing the upper limit QPM for the quantization parameter of the intra macroblock suppresses image degradation.

Also in the image processor 1 according to the present embodiment, the controller 3, when the generated amount of code of a predetermined number of macroblocks (15 macroblock lines in the above example) processed immediately before exceeds a predetermined threshold to be set depending on the maximum allowable amount of code, sets the quantization parameter of the currently target macroblock at a value obtained by adding a constant value to the quantization parameter of the previously processed macroblock. In this way, exceptional processing to forcibly set the quantization parameter at a greater value when the generated amount of code exceeds the threshold helps to prevent the generated amount of code from exceeding the maximum allowable amount of code.

While the invention has been described in detail, the foregoing description is in all aspects illustrative and not restrictive. It is therefore understood that numerous modifications and variations can be devised without departing from the scope.

EXPLANATION OF REFERENCE NUMERALS 1 image processor
2 encoder
3 controller
10 entire evaluation value arithmetic unit
11 partial evaluation value arithmetic unit
12 parameter determination unit
13 memory
14 bit number counter

The invention claimed is:
1. An image processor comprising:
circuitry configured to:
perform encoding including quantization on an image signal; and
control a quantization parameter for the quantization, wherein the circuitry is further configured to
determine a quantization parameter of a currently targeted macroblock for performing the encoding by either increasing or decreasing a value from a reference value; and
determine a target amount of code for a plurality of macroblocks fewer than a total number of macroblocks within one frame,
wherein the circuitry is further configured to determine the value based on a difference between the target amount of code and a generated amount of code of macroblocks traced back at least one macroblock line from the currently targeted macroblock, the encoding having been performed on the macroblocks traced back at least one macroblock line from the currently targeted macroblock, wherein the circuitry is further configured to determine the reference value by calculating an average of quantization parameters of the macroblocks traced back one macroblock line from the currently targeted macroblock, and wherein the circuitry is further configured to perform the encoding on the image signal using the determined quantization parameter.

2. The image processor according to claim 1, wherein the circuitry is further configured to determine the value, based on a minimum of activity evaluation values of four side areas of the currently targeted macroblock.

3. The image processor according to claim 1, wherein the circuitry is further configured to determine the value, based on a sum of absolute difference of a prediction error obtained by motion search of the currently targeted macroblock.

4. The image processor according to claim 1, wherein the circuitry is further configured to determine the value, based on a generated amount of code of a previously processed macroblock.

5. The image processor according to claim 1, wherein the circuitry is further configured to determine the value, based on the difference between the target amount of code for the plurality of the macroblocks and the generated amount of code of the macroblocks traced back at least one macroblock line from the currently targeted macroblock, and an attribute value of the currently targeted macroblock.

6. The image processor according to claim 5, wherein the circuitry is configured to determine the attribute value, based on a result of edge detection of the currently targeted macroblock.

7. The image processor according to claim 6, wherein the circuitry is further configured to determine the attribute value, based on a minimum of activity evaluation values of four side areas of the currently targeted macroblock.

8. The image processor according to claim 6, wherein the circuitry is further configured to determine the attribute value, based on an activity evaluation value of an entire area of the currently targeted macroblock.

9. The image processor according to claim 1, wherein the circuitry, in increasing the quantization parameter of the currently targeted macroblock from a quantization parameter of a macroblock traced back at least one macroblock line from the currently targeted macroblock, is configured to employ a predetermined value as the reference value, when the reference value is smaller than the predetermined value.

10. The image processor according to claim 1, wherein the circuitry, in decreasing the quantization parameter of the currently targeted macroblock from a quantization parameter of a macroblock traced back at least one macroblock line from the currently targeted macroblock, is configured to employ a predetermined value as the reference value, when the reference value is greater than the predetermined value.

11. The image processor according to claim 9, wherein the predetermined value is set at a different value, depending on an activity evaluation value of an entire area of the currently target macroblock.

12. The image processor according to claim 9, wherein the predetermined value is set at a different value, depending on a predetermined attribute value of the currently target macroblock.

13. The image processor according to claim 9, wherein the predetermined value is set at a different value, depending on the difference between the target amount of code for the plurality of macroblocks and the generated amount of code of the macroblocks traced back at least one macroblock line from the currently targeted macroblock.

14. The image processor according to claim 1, wherein the circuitry is further configured to determine the value, based on a generated amount of code in an area corresponding to the currently targeted macroblock within a frame traced back at least one macroblock line from the currently targeted macroblock.

15. The image processor according to claim 1, wherein the circuitry is further configured to determine the value, based on occurrence of a character area within a plurality of macroblocks ahead of the currently targeted macroblock.

16. The image processor according to claim 1, wherein the macroblocks include an intra-macroblock.

17. The image processor according to claim 16, wherein a quantization parameter of the intra macroblock has a predetermined upper limit.

18. The image processor according to claim 1, wherein the circuitry, when the generated amount of code of the macroblocks traced back at least one macroblock line from the currently targeted macroblock exceeds a predetermined threshold to be set depending on a maximum allowable amount of code, is configured to set the quantization parameter of the currently targeted macroblock at a value obtained by adding a constant value to a quantization parameter of a macroblock traced back at least one macroblock line from the currently targeted macroblock.

19. The image processor according to claim 1, wherein the circuitry is further configured to determine an attribute value, based on a minimum of activity evaluation values of four side areas of the currently targeted macroblock and an activity evaluation value of an entire area of the currently targeted macroblock, with respect to a plurality of different thresholds.

* * * * *